United States Patent [19]
Daniels et al.

[11] 3,868,360
[45] Feb. 25, 1975

[54] PROCESS FOR PREPARING 2-DEROXY-3-DESAMINO-2,3-EPIMINO-AMINOGLYCOSIDES AND INTERMEDIATES USEFUL THEREIN

[75] Inventors: Peter J. L. Daniels, Cedar Grove; Jay Weinstein, Bloomfield, both of N.J.

[73] Assignee: Shering Corporation, Bloomfield, N.J.

[22] Filed: Oct. 24, 1972

[21] Appl. No.: 299,983

[52] U.S. Cl.... 260/210 AB, 260/210 K, 260/210 R, 424/180
[51] Int. Cl............................................. C07c 47/18
[58] Field of Search....... 260/210 AB, 210 R, 210 K

[56] References Cited
UNITED STATES PATENTS

| | | | |
|---|---|---|---|
| 3,268,508 | 8/1966 | Sugazawa et al............... | 260/210 K |
| 3,651,042 | 3/1972 | Marquez et al. ............ | 260/210 AB |

*Primary Examiner*—Johnnie R. Brown
*Attorney, Agent, or Firm*—Mary S. King; Stephen B. Coan

[57] ABSTRACT

2''-Deoxy-3''-desamino-2'',3''-epimino-aminoglycosides useful as intermediates in preparing antibacterially active 2''-deoxyaminoglycosides, are prepared from antibacterially active aminoglycosides having a 2''-hydroxyl group and a 3''-primary or secondary amino function, by a process which comprises protecting primary amino groups and secondary amino groups capable of oxazolidine formation with an aldehyde and a neighboring hydroxyl group, by conversion thereof to Schiff base-oxazolidine condensation products with aldehydes (preferably benzaldehyde), converting any protectable primary and secondary hydroxyl groups to a trityl ether or to a cyclic ketal or acetal, treating said N-protected-O-protected-aminoglycoside with a hydrocarbonsulfonyl halide in a tertiary amine, treating the resulting N-protected-O-protected-2''-O-hydrocarbonsulfonylaminoglycoside (novel intermediates) with dilute aqueous acid to a pH in the range of from about 1 to about 5, and converting the resulting 2''-O-hydrocarbonsulfonylaminoglycoside to a 2''-deoxy-3''-desamino-2'',3''-epiminoaminoglycoside either by spontaneous transformation or heating in a lower alkanol alone or together with an alkali metal salt of said alkanol. The 2''-deoxy-3''-desamino-2'',3''-epiminoaminoglycosides upon hydrogenation followed by acid hydrolysis of any ketal or acetal functions are converted to a product mixture comprising an antibacterially active 2''-deoxyaminoglycoside isolatable via chromatographic techniques.

14 Claims, No Drawings

3,868,360

1

PROCESS FOR PREPARING 2-DEROXY-3-DESAMINO-2,3-EPIMINO-AMINOGLYCOSIDES AND INTERMEDIATES USEFUL THEREIN

The 2''-deoxy-3''-desamino-2'',3''-epiminoaminoglycosides upon hydrogenation followed by acid hydrolysis of any ketal or acetal functions are converted to a product mixture comprising an antibacterially active 2''-deoxyaminoglycoside isolatable via chromatographic techniques.

FIELD OF INVENTION

This invention relates to an improved process and to novel intermediates produced thereby.

More specifically, this invention relates to an improved process for the preparation of 2''-deoxy-3''-desamino-2'',3''-epiminoaminoglycoside derivatives useful as intermediates in the preparation of antibacterially active 2''-deoxy-aminoglycosides, and to novel intermediates produced thereby.

DESCRIPTION OF THE PRIOR ART

Novel 2''-deoxyaminoglycosides and 2''-epi-amino-3''-desamino derivatives thereof, valuable as antibacterial agents, methods for their manufacture, and novel intermediates produced thereby, are described and claimed in co-pending application Ser. No. 300,083, filed concomitantly herewith of Peter J.L. Daniels for 2''-*Deoxyaminoglycosides and* 2''-*Epi-Amino-*3''-*Desamino Derivatives Thereof, Methods for their Manufacture and Novel Intermediates Useful Therein*. Among the antibacterial agents disclosed therein are 2''-deoxygentamicins and 2''-deoxy derivatives of related aminoglycosides such as 2''-deoxysisomicin, 2''-deoxytobramycin, 2''-deoxyverdamicin, 2'',3',4'-trideoxykanamycin B, 2''-deoxy-Antibiotic JI–20–A, 2''-deoxy-Antibiotic JI–20–B, and 2''-deoxy-Antibiotic G–418, as well as the 2''-epi-amino-3''-desamino or 2-''-epi-methylamino-3''-desmethylamino analogs thereof. Among those disclosed as preferred compounds are 2''-deoxygentamicin $C_1$, 2''-deoxygentamicin $C_1a$, 2''-deoxygentamicin $C_2$, 2''-deoxysisomicin and 2''-deoxyverdamicin and non-toxic pharmaceutically acceptable acid addition salts thereof.

Described in said copending application is a method for preparing the 2''-deoxyaminoglycosides in admixture with the corresponding 3''-desamino-2''-epi-amino-derivatives which comprises treating an antibacterially active aminogycoside having a 2''-hydroxyl group and a 3''-amino function, and having primary and secondary amino functions protected by carbobenzyloxy groups, and protectable primary and secondary hydroxyl groups converted to a triphenylmethyl ether or to a cyclic ketal or acetal derivative, with a hydrocarbonsulfonyl halide in pyridine; removing the carbobenzyloxy groups in the thereby formed 2''-O-hydrocarbonsulfonyl-per-N-carbobenzyloxy-O-protected-aminoglycoside by treatment with hydrogen in the presence of a catalyst or by cleavage with an alkali metal in liquid ammonia; converting the resulting 2''-O-hydrocarbonsulfonylaminoglycoside to the corresponding 2''-deoxy-3''-desamino-2'',3''-epimino intermediate by means selected from the group consisting of spontaneous formation, and heating at temperatures in the range of from about 25°C to about 100°C in a lower alkanol alone or in the presence of an alkali metal salt of a lower alkanol. The 2''-deoxy-3''-desamino-2'',3''-epimino-aminoglycoside intermediate thereby formed is then cleaved, followed by acid hydrolysis of any O-protecting groups which are present to form a mixture of the corresponding antibacterially active 2''-deoxy-aminoglycoside and the 3''-desamino- 2''-epi-amino-analog thereof. It is disclosed that cleavage can be effected by hydrogenolysis in the presence of a catalyst or by N-derivatization of the 2''-deoxy-3''-desamino-2'',3''-epimino-aminoglycoside intermediate optionally followed by quaternization of the epimino function with a benzyl halide and hydrogenolysis of the N-derivatized compound, or cleavage may be effected by treating the 2''-deoxy-3''-desamino-2'', 3''-epimino-aminoglycoside or N-protected derivative thereof with a sulfur nucleophile followed by desulfurization of the thio derivative thereby formed. Separation of the resulting product mixture may be carried out either before or after removal of any N-protecting groups which are present.

By our invention, we have discovered an improvement in the foregoing process for preparing the 2''-deoxy-3''-desamino-2'',3''-epimino-aminoglycoside intermediates, which comprises protecting the primary amino groups and secondary amino groups capable of oxazolidine formation with an aldehyde and a neighboring hydroxyl group, by conversion thereof to Schiff base-oxazolidine condensation products with an aldehyde, which derivatives are more easily prepared than are the N-carbobenzyloxy protecting groups used in the method described in said copending application. Moreover, after preparation of the 2''-O-hydrocarbonsulfonylaminoglycoside derivative, the aldehyde blocking groups are more easily removed than are N-carbobenzyloxy groups and result in purer 2''-deoxy-3''-desamino-2'',3''-epimino-aminoglycoside intermediate over that obtained with carbobenzyloxy protected aminoglycosides. In addition to the foregoing, O-protecting functions such as ketals, triphenylmethyl ethers, are also advantageously removed under the acidic conditions whereby the N-protecting–Schiff base-oxazolidine groups are cleaved, eliminating a step in the overall process of converting an aminoglycoside having a 2''-hydroxy function to a 2''-deoxyaminoglycoside.

SUMMARY OF THE INVENTION

The process aspect of the invention sought to be patented resides in the improvement in a process for preparing a 2''-deoxy-3''-desamino-2'',3''-epimino-aminoglycoside, valuable as an intermediate, wherein an antibacterially active aminoglycoside having a 2''-hydroxy group and a 3''-amino function and having a primary and secondary amino groups protected by carbobenzyloxy groups, and also having protectable primary and secondary hydroxyl groups converted to O-protecting functions selected from the group consisting of a triphenylmethyl ether of a primary hydroxyl group and a cyclic ketal or acetal of protectable neighboring hydroxyl groups, is treated with a hydrocarbonsulfonyl halide having up to eight carbon atoms in a tertiary amine, the thereby formed 2''-O-hydrocarbonsulfonyl-O-protected-per-N-carbobenzyloxyaminoglycoside is treated with a reagent selected from the group consisting of hydrogen in the presence of a catalyst, and an alkali metal in liquid ammonia whereby the N-carbobenzyloxy groups are removed; and the resulting 2''-O-hydrocarbonsulfonyl-O-protected-aminoglycoside is converted to a 2''-deoxy-3''-desamino-2'',3''-epimino-aminoglycoside having O-protecting groups by means selected from the group consisting of spontaneous transformation and heating in a lower alkanol alone or together with an alkali metal salt of said alkanol at temperatures in the range of from about 25°C to about 100°C;

The improvement which comprises protecting primary amino groups and secondary amino groups capable of oxazolidine formation with an aldehyde and a neighboring hydroxyl group in said antibacterially active aminoglycoside by conversion thereof to Schiff base-oxazolidine condensation product with an aldehyde; and, after preparation of the 2''-O-hydrocarbonsulfonyl ester thereof, treating the resulting 2''-O-hydrocarbonsulfonylaminoglycoside having N-protecting-Schiff base-oxazolidine groups with dilute aqueous acid to a pH in the range of from about 1 to about 5, whereby said N-protecting–Schiff base-oxazolidine groups are removed.

A preferred species of the improvement process of this invention is that wherein the primary and secondary amino functions are converted to condensation products with benzaldehyde and wherein the protectable hydroxyl groups are converted to acetal functions with benzaldehyde whereby, after hydrocarbonsulfonylation of the 2''-hydroxy group, both the N-benzylidene, N,O-benzylidene and O-benzylidene protecting groups are easily and simultaneously removed under the reaction conditions of our process by acid treatment to a pH in the range of from about 1 to about 5, preferably with dilute hydrochloric acid, yielding a 2''-hydrocarbonsulfonylaminoglycoside which is converted to a 2''-deoxy-3''-desamino-2'',3''-epimino-aminoglycoside intermediate free of O-protecting functions, which, upon hydrogenation in the presence of a catalyst, can be converted directly to a 2''-deoxyaminoglycoside free of O-protecting functions, thus eliminating the step of removing the O-protecting groups necessary in the prior art process utilizing N-carbobenzyloxy protecting groups.

Novel compositions-of-matter of this invention include 2''-O-hydrocarbonsulfonylaminoglycoside intermediates derived from known aminoglycoside antibacterials having a 2''-hydroxy group and a 3''-amino function wherein primary amino functions and secondary amino functions capable of oxazolidine formation with an aldehyde and a neighboring hydroxyl group are protected by conversion thereof to Schiff base-oxazolidine condensation products with aldehydes and wherein protectable neighboring primary and secondary hydroxyl groups are converted to a member selected from the group consisting of a cyclic ketal or acetal selected from the group consisting of alkylidene, cycloalkylidene and arakylidene or wherein any primary hydroxyl group is converted to a triphenylmethyl ether.

Preferred intermediates are those wherein the 2''-O-hydrocarbonsulfonyl is 2''-O-methanesulfonyl and wherein the N-protecting, N,O-protecting and O-protecting groups are benzylidenes. Of paticular value are 2''-O-methanesulfonyl-N,O-benzylidene-tetra-N-benzylidene derivatives of gentamicin $C_1A$, gentamicin $C_2$, gentamicin $C_2a$, sisomicin, and verdamicin, 2''-O-methanesulfonyl-O-benzylidene-N,O-benzylidene-tri-N-benzylidene derivatives of gentamicin B, gentamicin $B_1$, gentamicin $X_2$, and Antibiotic G–418, 2''-O-methanesulfonyl-O-benzylidene-N,O-benzylidene-tetra-N-benzylidene derivatives of Antibiotic JI–20–A, Antibiotic JI–20–B, and 2''O-methanesulfonyl-O-benzylidene-penta-N-benzylidene derivatives of tobramycin and of 3',4'-dideoxykanamycin B.

COMPOUNDS USEFUL AS INTERMEDIATES

Compounds of this invention useful as intermediates are novel derivatives of known aminoglycoside antibiotics having a 2''-hydroxy group and a 3''-amino function, including compounds selected from the group consisting of 2''-O-hydrocarbonsulfonylaminoglycosides such as defined by structural formulae I(a) and I(b) and I(c) shown hereinbelow and the cyclic ketal and cyclic acetal derivatives thereof:

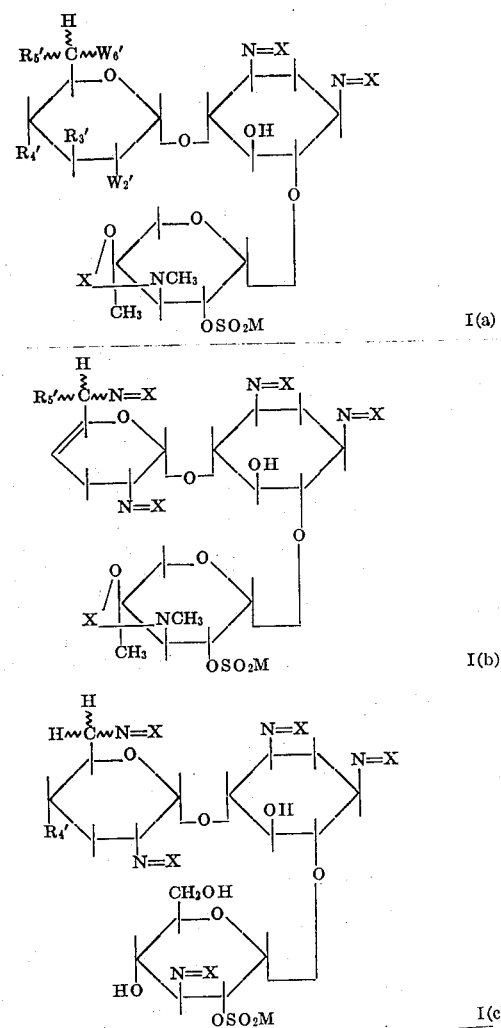

wherein M is a hydrocarbon radical having up to 8 carbon atoms; $R_3'$ and $R_4'$ are each members selected from the group consisting of hydrogen and hydroxy; $R_5'$ is a member selected from the group consisting of hydrogen and methyl; $W_2'$ is a member selected from the group consisting of hydroxy and —N=X; $W_6'$ is a member selected from the group consisting of hydroxy, —N=X, and

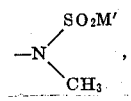

M' being an aryl radical having up to 8 carbon atoms; X is an organic radical bonded to the oxygen and the amino group through a bivalent carbon atom, and includes alkylidene radicals, arakylidene radicals and substituted aralkylidene radicals, optionally having functional substituents other than hydroxy. Thus, X can be an aliphatic, aromatic or heterocyclic radical.

Alkylidene radicals may be straight or branched and include, for example, ethylidene, propylidene, hyxylidene, decylidene, dodecylidene, and the isomeric forms thereof. Cycloalkylidene radicals include cylcopropylidene, cyclopentylidene, cyclohexylidene, 3-cyclohexylpropylidene and the like.

Examples of aralkylidene radicals include benzylidene, 2-phenethylidene, 3-phenylpropylidene, naphthylidene, 3,6-dichlorobenzylidene, p-nitrobenzylidene, p-chlorobenzylidene and the like. It is understood, of course, that the aryl nucleus can be substituted by functional groups such as halogen, nitro, trifluoromethyl, lower alkyl and the like. Examples of suitable heterocyclic radicals are those derived from aromatic heterocyclic ring aldehydes such as aldehydes having furyl, thienyl, thiazolyl, thiadiazolyl, pyrazinyl, triazoyl, pyridyl, pyrazolyl, imidazolyl, oxazolyl, pyrimidinyl, pyrrolyl, dihydroimidazolyl, dihydropyridazinyl, benzimidazolyl, indazolyl, benzoxazylyl, pyrazolonyl, pyranyl, pyridazinyl, and dihydropyridazinyl rings and substituted derivatives thereof wherein the substituent can be, for example, lower alkyl, halogeno, and nitro.

The 2''-hydrocarbonsulfonyl derivatives contemplated are those derived from hydrocarbonsulfonic acids having up to 8 carbon atoms including ethanesulfonic acid, benzenesulfonic acid, p-toluenesulfonic acid, and preferably, methanesulfonic acid (i.e., compounds of formulae I(a), I(b) and I(c) hereinabove wherein M is ethyl, phenyl, p-tolyl, and methyl, respectively).

By "protectable neighboring hydroxyl groups" are contemplated vicinal and non-vicinal hydroxyl groups which together will form ketal and acetal functions with ketone derivatives and with aldehydes. Exemplary of such protectable hydroxyl groups are the 2',3',4'-hydroxy groups in gentamicin B and B$_1$, the 4',6'-hydroxy groups in gentamicin X$_2$ and in Antibiotic G-418, the 3',4'-hydroxy groups in Antibiotics JI-2-0-A and JI-20-B, and the 4'',6''-hydroxy groups in tobramycin and 3',4'-dideoxykanamycin B.

The cyclic ketal and acetal derivatives of said neighboring protectable hydroxyl groups of this invention include O-alkylidene (e.g., O-propylidene), O-cycloalkylidene (e.g., O-cyclohexylidene) and O-aralkylidene (e.g., O-benzylidene) derivatives.

Preferred intermediates of formulae I(a), I(b) and I(c) are those wherein M is methyl, and X is benzylidene, particularly the compounds of formula I(a) wherein W$_2$' is benzylideneamino and the compounds of formula I(b), and which are derived from gentamicin C$_1$a, gentamicin C$_2$, gentamicin C$_2$a, sisomicin and verdamicin. Included within this preferred group of intermediates are the following:

2''-O-methanesulfonyl-1,3,2',6'-tetra-N-benzylidene-3'',4''-N,O-benzylidenegentamicin C1a (compound of formula I(a) wherein W$_6$' is benzylideneamino and R$_3$', R$_4$', and R$_5$' are hydrogen);

2''-O-methanesulfonyl-1,3,2',6'-tetra-N-benzylidene-3'',4''-N,O-benzylidenegentamicin C$_2$ (compound of formula I(a) wherein W$_6$' is benzylideneamino, R$_3$' and R$_4$' are hydrogen and R$_5$' is methyl, the stereochemistry at C-6' being R);

2''-O-methanesulfonyl-1,3,2',6'-tetra-N-benzylidene-3'',4''-N,O-benzylidenegentamicin C2a (compound of formula I(a) wherein W$_6$' is benzylideneamino, R$_3$' and R$_4$' are hydrogen and R$_5$' is methyl, the stereochemistry at C-6' being S);

2''-O-methanesulfonyl-1,3,2',6'-tetra-N-benzylidene-3'',4''-N,O-benzylidenesisomicin (compound of formula I(b) wherein R$_5$' is hydrogen); and 2''-O-methanesulfonyl-1,3,2',6'-tetra-N-benzylidene-3'',4''-N,O-benzylideneverdamicin (compound of formula I(b) wherein R$_5$' is methyl).

Other useful intermediates of formulae I(a), I(b) and I(c) include those derived from gentamicin B, gentamicin B$_1$, gentamicin X$_2$ and Antibiotics JI-20-A, JI-2-0-B and G-418 which have protectable neighboring hydroxyl groups converted to a cyclic ketal or acetal thereof, preferably the benzylidene derivatives such as the following:

2''-O-methanesulfonyl-2',3'(and 3',4')-O-benzylidene-1,3,6'-tri-N-benzylidene-3'',4''-N,O-benzylidenegentamicin B (a compound of formula I(a) wherein M is methyl, X is benzylidene, W$_6$' is benzylideneamino, R$_5$' is hydrogen, and W$_2$', R$_3$' and R$_4$' are hydroxyl groups converted to the corresponding 2',3'' (and 3',4')-O-benzylidene acetal derivative thereof);

2''-O-methanesulfonyl-2',3'(and 3',4')-O-benzylidene-1,3,6'tri-N-benzylidene-3'',4''-N,O-benzylidenegentamicin B$_1$, 2''-O-methanesulfonyl-4',6'-O-benzylidene-1,3,2'-tri-N-benzylidene-3'',4''-N,O-benzylidenegentamicin X$_2$, 2''-O-methanesulfonyl-3',4'-O-benzylidene-1,3,2'-tetra-N-benzylidene-3''-N,O-benzylidene-Antibiotic JI-20-A, 2''-O-methanesulfonyl-3',4'-O-benzylidene 1,3,2',6'-tetra-N-benzylidene-3'',4''-N,O-benzylidene-Antibiotic JI-20-B, and 2''-O-methanesulfonyl-4',6'-O-benzylidene-1,3,2'-tri-N-benzylidene-3'',4''-N,O-benzylidene-Antibiotic G-418.

In addition to the foregoing, other valuable intermediates of this invention as defined by Formulas I(a), I(b) and I(c) are 2''-O-methanesulfonyl and 2''-O-p-toluenesulfonyl-aminoglycosides having per-N-aralkylidene protecting groups other than per-N-benzylidene, e.g., per-N-(2-phenethylidene), per-N-naphthylidene, per-N-(p-chlorobenzylidene), as well as 2''-O-methanesulfonyl and 2''-O-p-toluenesulfonyl aminoglycosides having per-N-alkylidene groups, e.g., per-N-propylidene, or per-N-cyclo-alkylidene protecting groups, e.g., per-N-cyclohexylidene, particularly derivatives of aminoglycosides such as gentamicin C1a, gentamicin C$_2$, gentamicin C2a, sisomicin and verdamicin. Other valuable intermediates include the 4',6'-O-benzylidene-per-N-benzylidene and the 4',6'-N,O-propylidene-per-N-propylidene-derivatives of the 2''-O-methanesulfonyl esters of gentamicin X$_2$ and of Antibiotic G-418, the corresponding 3'',4''-N,O-benzylidene-per-N-benzylidene and 3',4'-N,O-propylidene-per-N-propylidene derivatives of the 2''-O-methanesulfonyl esters of Antibiotic JI-20-A and JI-20-B, as well as the product mixtures comprising the 2',3'(and 3',4')-N,O-benzylidene-per-N-benzylidene and the 2',3'(and 3',4')-N,O-propylidene-per-N-propylidene derivatives of the 2''-O-methanesulfonyl esters of gentamicin B and gentamicin $B_1$.

Also included within this invention are 2''-O-hydrocarbonsulfonyl derivatives of formulae I(a), I(b) and I(c) having primary hydroxyl groups protected as an ether derivative, e.g., an O-triphenylmethyl ether derivative, such as:

2''-O-methanesulfonyl-6''-O-triphenylmethyl-1,3,2',6',3''-penta-N-benzylidene tobramycin, 2''-O-methanesulfonyl-6''-O-triphenylmethyl-1,3,2',6',3''-penta-N-benzylidene-3',4'-dideoxykanamycin B, 2''-O-methanesulfonyl-6'-O-triphenylmethyl-1,3,2'-tri-N-benzylidene-3'',4''-N,O-benzylidenegentamicin $X_2$.

Other valuable intermediates are the 2''-O-p-toluene-sulfonyl-6'-N-p-toluenesulfonyl-per-N-ylidene derivatives of gentamicin $C_1$, e.g., 6',2''-di-N,O-p-toluenesulfonyl-1,3,2'-tri-N-benzylidene-3'',4''-N,O-benzylidenegentamicin $C_1$, and 6',2''-di-N,O-p-toluenesulfonyl-1,3,2'-tri-N-propylidene-3'',4''-N,O-propylidenegentamicin $C_1$.

The 2''-O-hydrocarbonsulfonyl-per-N-ylidene-aminoglycoside derivatives of formulae I(a), I(b), and I(c) are valuable as intermediates in our improved process for preparing 2''-deoxy-3''-desamino-2'',3''-epiminoaminoglycosides, in turn valuable as intermediates in preparing 2''-deoxyaminoglycosides and the 2''-epi-amino-3''-desamino analogs therof having antibacterial activity.

The preparation of the novel intermediates of formulae I(a), I(b) and I(c) from an antibacterially active aminoglycoside having a 2''-hydroxyl group and a 3''-amino function is described hereinbelow in the description of the process aspect of this invention.

GENERAL DESCRIPTION OF THE PROCESS ASPECT OF THE INVENTION

Included among the 2''-deoxy-3''-desamino-2'',3''-epiminoaminoglycoside intermediates prepared by our improved process are compounds defined by following formulae II(a) and II(b):

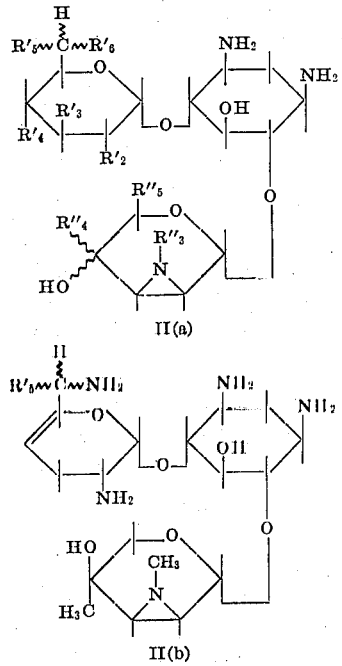

wherein $R_2'$ is a member selected from the group consisting of amino and hydroxy; $R'_3$ and $R'_4$ are each members selected from the group consisting of hydrogen and hydroxy; $R'_5$, $R''_3$ and $R''_4$ are each members selected from the group consisting of hydrogen and methyl; $R'_6$ is a member selected from the group consisting of hydroxy, amino and methylamino; and $R''_5$ is a member selected from the group consisting of hydrogen and hydroxymethyl.

Typical intermediates of formulae II(a) and II(b) are as follows:

2''-deoxy-3''-desmethylamino-2'',3''-N-methylepiminogentamicin C1a,

2''-deoxy-3''-desmethylamino-2'',3''-N-methylepiminogentamicin C2,

2''-deoxy-3''-desmethylamino-2'',3''-N-methylepiminosisomicin,

2''-deoxy-3''-desmethylamino-2'',3''-N-methylepiminogentamicin X2, and

2''-deoxy-3''-desamino-2'',3''-epiminotobramicin.

Compounds of formulae II(A) and II(b) are prepared and, in turn, are converted to antibacterially active 2''-deoxyaminoglycosides (i.e., 2''-deoxy-nonderivatized analogs of formulae I(a), I(b) and I(c) and 3''-desamino-2''-epi-amino-analogs thereof, according to a process described in co-pending application Ser. No. 300,083, whereby an antibacterially active aminoglycoside having a 2''-hydroxy function and a 3''-primary or secondary amino function, and having primary and secondary amino functions protected by N-carbobenzyloxy groups and protectable neighboring primary and secondary hydroxy groups derivatized, is converted to a per-N-carbobenzyloxy-2''-O-hydrocarbonsulfonate ester followed by removal of the carbobenzyloxy groups, usually by hydrogenation in the presence of a catalyst or, when easily reduceable double bonds are present in the molecule such as the 4',5'-double in sisomicin and verdamicin, by cleavage with an alkali metal (e.g., lithium, sodium or potassium) in liquid ammonia, using 2 gm. atoms of said alkali metal for each carbobenzyloxy group present. The 2''-O-hydrocarbonsulfonate ester having free amino groups thereby formed either spontaneously ring closes in situ to form a 2''-deoxy-3'' -desamino-2'',3''-epimino-aminoglycoside intermediate, or the conversion is effected by heating the 2''-O-hydrocarbonsulfonate ester in a lower alkanol (e.g., methanol) either alone or together with an equivalent molar quantity of an alkali metal salt of said alkanol (e.g., sodium methylate) at temperatures in the range of from about 25°C to about 100°C. The epimino (or methylepimino) intermediate thereby formed is then treated with hydrogen in the presence of a catalyst (e.g., palladium on charcoal) or by other described methods followed by acid hydrolysis of any ketal or acetal functions which may be present whereby is formed a product mixture comprising a 2''-deoxy-aminoglycoside together with a 2''-deoxy-3''-desmethylamino (or desamino)-aminoglycoside which mixture is separable via chromatographic techniques.

In the improved process of this invention, the primary and secondary amino functions in the aminoglycoside starting compound are protected as Schiff base-oxazolidine condensation products with aldehydes (preferably N-benzylidene and N,O-benzylidene derivatives) which, after preparation of the 2''-O-hydrocarbonsulfonate ester, are conveniently removed by treatment with dilute aqueous acid. The use of Schiff base-oxazolidine N-protecting groups represents an improvement of the prior art N-carbobenzyloxy process outlined hereinabove, in that the N-Schiff base and N,O-oxazolidine groups are usually easier to prepare and easier and less expensive to remove than are the N-carbobenzyloxy protecting groups of my process, and their use in our process usually results in higher yields of the 2'''-deoxy-3''-desamino (or desmethylamino)-2'',3''-epimino (or N-methylepimino)-aminoglycoside key intermediate of the process.

Removal of the prior art carbobenzyloxy protecting groups requires hydrogenation techniques which must be carried out under carefully controlled conditions and which require expensive catalysts: whereas removal of the Schiff base-oxazolidene protecting groups of our invention requires only the addition of dilute acid to a solution of the N-protected-intermediate. Our improved process is particularly useful when converting aminoglycosides having easily reduceable double bonds, e.g., sisomicin and verdamicin, which are unaffected under the conditions of the process of this invention, but which become reduced when carbobenzyloxy groups are cleaved by hydrogenation in the presence of a catalyst, thus necessitating removal of the carbobenzyloxy groups by means of an alkali metal in liquid ammonia, a much more time consuming and expensive procedure than removal of the Schiff base-oxazolidine protecting groups of this invention.

Additionally, by our improved process, any O-protecting groups which may be present in the molecule, e.g., acetals (preferably O-benzylidene) and O-triphenylmethyl ethers, are removed simultaneously with the Schiff base-oxazolidine groups upon treatment with acid, thus advantageously eliminating a step in the overall process of converting a 2''-hydroxyaminoglycoside to a 2''-deoxyaminoglycoside.

Our improved process is indicated schematically hereinbelow in Chart A wherein only the 3''-amino sugar ring of the aminoglycosides of the invention are shown, the Roman numeral below a partial formula referring to the complete structural formula similarly identified hereinabove, the substitutent "V" designating the two rings of the aminoglycosides as disclosed in formulae I(a), I(b), I(c), II(a) and II(b) hereinabove, the V substituent of intermediate A including the two upper rings as defined by both formulae II(a) and II(b) hereinabove, the substituent V' of starting compound A' including the two other rings of tobramycin and of 3',4'-dideoxykanamycin B, i.e., rings as defined by formula II(a) wherein $R_2'$ and $R_6'$ are each amino, $R_3'$ and $R_5'$ are each hydrogen, $R_4'$ is hydrogen or hydroxy, the substituents $R_3''$, $R_4''$, $R_5''$, M and X being as heretofore defined for formulae I(a), I(b) and I(c).

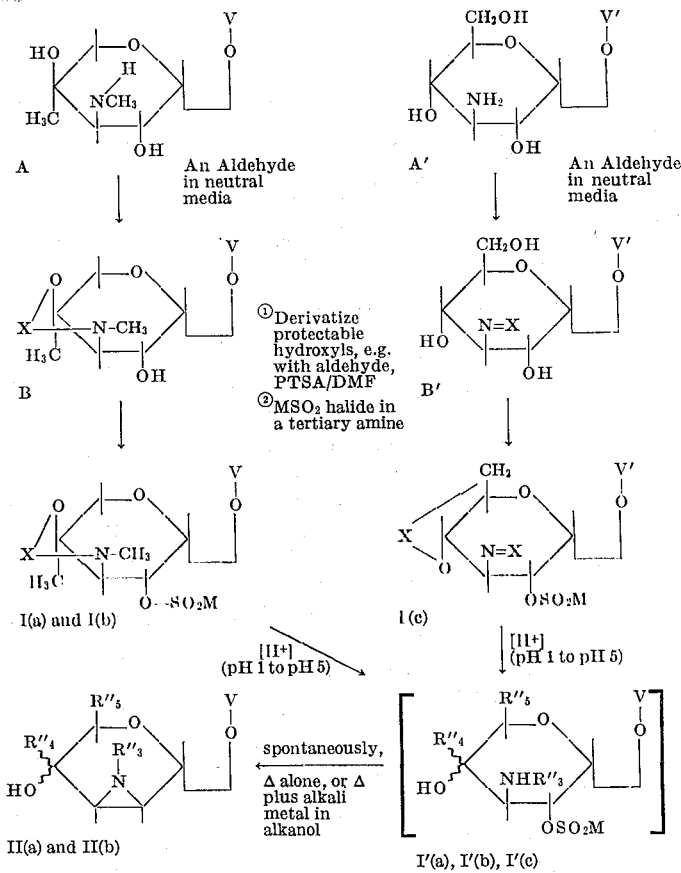

Chart A

The starting compounds of our process (designated as Compounds A and A' in Chart (A) can be any aminoglycoside having a 2''-hydroxyl group and having a primary or secondary amino function at the 3''-position which exhibits antibacterial activity against gram positive and/or gram negative organisms as determined by conventional in vitro techniques such as tube dilution tests, agar diffusion tests, disc diffusion tests, and the like. An aminoglycoside which inhibits bacteria at concentrations equal to or less than about 50 to 100 mcg./ml. is considered to be an antibacterial agent. These aminoglycoside antibacterial starting compounds can be antibiotics such as gentamicin $C_2$ or derivatives of antibiotics such as 3',4'-dideoxykanamycin B.

Typical starting aminoglycoside antibacterials are such as the gentamicins (including gentamicin B, gentamicin $B_1$, gentamicin $C_1$, gentamicin $C1a$, gentamicin $C2$, gentamicin $C2a$, gentamicin $X_2$ and mixtures thereof), sisomicin, verdamicin, Antibiotic JI-20-A, Antibiotic JI-20-B, Antibiotic G-418, tobramycin and 3', 4'-dideoxykanamycin B.

Most of the aforementioned aminoglycoside antibiotics are known. Of the gentamicins, the starting compound referred to herein as gentamicin $X_2$ is also known in the art as gentamicin X; the starting compounds referred to herein as gentamicin $C_2$ and gentamicin $C2a$ are stereoisomeric with each other about the carbon at the 6'-position (i.e., the 6'-carbon atom) gentamicin $C_2$ being a 2''-hydroxy derivative of formula I(a) hereinabove wherein $R_5'$ is methyl, $R_6'$ is amino, and the stereochemistry at C-6' is R; gentamicin $C2a$ being a 2''-hydroxy derivative of formula I(a) wherein $R_5'$ is methyl, $R_6'$ is amino, and the stereochemistry at C-6' is S. The isolation, properties and planar configuration of gentamicin $C_2$ is described in U.S. Pat. No. 3,651,042; while the isolation, properties and planar configuration of gentamicin $C2a$, as well as the stereoconfiguration about C-6' of gentamicin $C_2$ and $C2a$, is described in copending application of common assignee as that of the instant application of Peter J. L. Daniels and J. A. Marquez, entitled *Novel Antibiotic from Micromonospora*, Ser. No. 269,914 filed July 7, 1972.

Verdamicin, Antibiotic G-418, Antibiotic JI-20-A and Antibiotic JI-20-B are all also described in copending U.S. applications of common assignee as that of the instant application; verdamicin being described in U.S. application Ser. No. 208,907 filed Dec. 16, 1971 as a continuation-in-part of U.S. Ser. No. 58,050 filed July 24, 1970, and both now abandoned, of M. J. Weinstein, G. H. Wagman, and J. Marquez entitled *Antibiotics and Process for Their Manufacture*; Antibiotic G-418 being described in application U.S. Ser. No. 196,707 filed Nov. 8, 1971, now abandoned, of M. J. Weinstein, G. H. Wagman, R. Testa and J. Marquez entitled *Antibiotic G-418 and Production Thereof*; while Antibiotics JI-20-A and JI-20-B are described in application U.S. Ser. No. 261,753 filed June 12, 1972, now abandoned, of Jan Ilavsky, Aris P. Bayan, William Charney and Hans Reimann entitled *New Antibiotic from Micromonospora Purpurea JI-20*.

In our improved process as indicated schematically in Chart A, to prepare the requisite N-protected intermediates B and B' an aminoglycoside having a 2''-hydroxy group and a 3''-primary or secondary amino function (designated as compounds A and A' in Chart A) is condensed with an aldehyde (preferably benzaldehyde) in an inert organic solvent utilizing techniques known in the art for preparing Schiff base-derivatives, whereby are formed Schiff base-derivatives (i.e., N-ylidenes, e.g., N-benzylidene) of primary amines therein (as illustrated by the 3''-(N=X)-derivative of formula B' in Chart A) and oxazolidine derivatives (i.e., N,O-ylidenes, e.g., N,O-benzylidenes) of secondary amines therein which are capable of oxazolidine formation with an aldehyde and a neighboring hydroxyl group (as illustrated by the 3'',4''-N,O-oxazolidene derivative in compound B of Chart A).

Aldehydes useful for forming N-protecting derivatives in our improved process include aldehydes having aliphatic, aromatic or heterocyclic radicals optionally substituted by functional groups as disclosed hereinabove in the description of the products of this invention. Since the process of this invention involves reactions of the 2''-hydroxy function of the aminoglycoside, it is preferable that the aldehyde with which the aminoglycoside starting compound is condensed be devoid of hydroxyl groups. Benzaldehyde is a convenient condensing reagent in our improvement process whereby are formed good yields of crystalline per-N-benzylidene-3'',4''-N,O-benzylideneaminoglycosides of formula B (Chart A) and per-N-benzylideneaminoglycosides of formula B' (Chart A) wherein "X" is benzylidene.

To minimize competing reactions when converting the 2''-hydroxyl group to a 2''-O-hydrocarbonsulfonyl ester derivative according to the prior art process, the primary hydroxyl groups and protectable neighboring hydroxyl groups in aminoglycoside starting compounds are also usually protected prior to reaction with a hydrocarbonsulfonyl halide as shown in Chart A, preferably as a cyclic acetal or cyclic ketal of vicinal and neighboring hydroxyl groups or as an ether (preferably a triphenylmethyl ether, also called a trityl ether) of any primary hydroxyl groups. Thus, prior to the conversion of the starting compounds (A and A') to the 2''-O-hydrocarbonsulfonate esters I(a), I(b) and I(c), and, after the primary and secondary amino functions have been converted to N-ylidene and N,O-ylidene derivatives, vicinal hydroxy groups such as those at the 3' and 4' positions in Antibiotics JI-20-A and JI-20-B and those at the 2',3', and 4' positions in gentamicin B and $B_1$ are converted to a cyclic ketal (e.g., to a 3',4'-O-isopropylidene) or to a cyclic acetal (e.g., to a 3',4'-O-benzylidene) by reaction thereof according to methods known in sugar chemistry as exemplified in the Procedures hereinbelow. In the case of gentamicin B and $B_1$, mixtures of the 3',4' and 2', 3'-O-ylidene derivatives are formed, which mixtures can be used, as is, in our process. Primary hydroxyl groups such as are present at C-6' in gentamicin A and $X_2$ or at C-6'' in tobramycin and 3',4'-dideoxykanamycin B can be protected by conversion to the corresponding trityl ether by reaction with triphenylmethyl chloride in pyridine or, together with a neighboring hydroxyl group, by conversion to a cyclic acetal, e.g., to the 4', 6'-O-isopropylidene derivatives of gentamicin A and of gentamicin $X_2$, and to the 4'',6''-O-iso-propylidene derivatives of tobramycin and 3',4'-dideoxykanamycin B. Exemplary of other protectable, neighboring hydroxyl groups is the grouping of secondary hydroxyl groups at C-3',C-4', and C-6' in Antibiotic G-418 which form a 4',6'-O-ylidene derivative when reacted with dimethoxypropane or benzaldehyde, for example.

In our improved process, we have found it most convenient to convert protectable hydroxyl groups to a cyclic acetal derived from the same aldehyde, preferably benzaldehyde, utilized for the N-protecting Schiff base-oxazolidine derivatives. Thus, treatment of 1,3,2',6'-tetra-N-benzylidene-3'',4''-N,O-benzylidene-Antibiotic JI-20-A with benzaldehyde and p-toluenesulfonic acid in dimethylformamide according to known procedures for preparing acetals yields the corresponding O-benzylidene derivative, i.e., 3',4'-O- benzylidene-1,3,2',6'-tetra-N-benzylidene-3'',4''-N,O-benzylidene Antibiotic JI–20–A.

After conversion of the amino-groups to N-ylidene and N,O-ylidene derivatives and derivatization of the protectable hydroxyl functions, the 2''-hydroxy group in the aminoglycoside intermediate (B or B') is converted to the corresponding hydrocarbonsulfonate ester, i.e., to a 2''-O-hydrocarbonsulfonyl derivative by treatment of said 2''-hydroxyaminoglycoside with a halide of a hydrocarbonsulfonic acid in a tertiary amine (a preferred reagent mixture being methanesulfonyl chloride in pyridine).

Any hydrocarbonsulfonic acid halide having up to eight carbon atoms is preferable for use in this step of our process, including the acid bromide and acid chloride derivatives of methanesulfonic acid, ethanesulfonic acid, benzenesulfonic acid and p-toluenesulfonic acid, methanesulfonyl chloride being a reagent of choice.

Among the tertiary amines contemplated as suitable for use in the esterification step are tertiary aliphatic and aromatic amines including cyclic amines such as trimethylamine, triethylamine, collidine, dimethylaminopyridine and, preferably, pyridine, which serve both as solvent and basic agent.

A convenient method of carrying out a preferred species of this esterification step (i.e., that which utilizes methanesulfonyl chloride in pyridine as the esterification medium) comprises preparing a solution of the aminoglycoside antibiotic having all primary and secondary amino groups and vicinal hydroxyl groups protected, e.g., penta-N-benzylidenegentamicin $C_2$, in dry pyridine to which is then added an acid halide, e.g., methanesulfonyl chloride, in amounts of from about 1 to 1.5 moles of acid halide per mole of aminoglycoside (usually about 1.1 moles of acid halide), and allowing this solution to stand at room temperature (about 25°C) for a period of about one to 6 hours, usually 3 hours. Anhydrous alkanol, e.g., methanol, is then added to decompose any excess sulfonic acid halide and the 2''-O-hydrocarbonsulfonyl derivative thereby prepared, e.g., 2''-O-methanesulfonyl-penta-N-benzylidenegentamicin $C_2$, is then conveniently isolated and purified utlilzing techniques known in the art such as solvent distillation, solvent extraction, precipitation, crystallization, chromatography and the like.

In our improved process, the 22'''-O-hydrocarbonsulfonyl-per-N-ylidene-O-protected-aminoglycoside intermediate, after isolation as described hereinabove, can be used without further purification in the next step of our process whereby both the per-N-Schiff base-oxazolidine and the O-protecting groups are simultaneously removed by treatment with dilute acid to a pH in the range of from about 1 to about 5. The resulting 2''-O-hydrocarbonsulfonate ester having free amino and free hydroxyl groups may spontaneously ring close in situ under the conditions of the reaction or of the isolation or purification of the product whereby is formed a 2''-deoxy-3''-desamino-2'',3''-epimino-aminoglycoside (II(a) and II(b)); alternatively, the conversion is effected by heating the 2''-O-hydrocarbonsulfonate ester in a lower alkanol (e.g., methanol) either alone or together with an equivalent molar quantity of an alkali metal salt of said alkanol (e.g., sodium methylate) at temperatures in the range of from about 25°C to about 100°C.

The 2''-deoxy-3''-desamino-2'',3''-epimino-aminoglycosides (II(a) and II(b)) are convertible to antibacterially active 2''-deoxyaminoglycosides and their 3''-desamino (or desmethylamino)-2''-epi-amino(or epi-methylamino) analogs thereof by hydrogenation in the presence of a catalyst or by other methods such as described in aforementioned copending application Ser. No. 300,083 of Peter J. L. Daniels.

A preferred mode of our improved process is that utilizing benzaldehyde as acetalizing agent, wherein the aminoglycoside requires only N-derivatization, and wherein the amino groups present are all either primary or are secondary amines capable of forming oxazolidine derivatives with an aldehyde and a neighboring hydroxyl group. Aminoglycosides within this preferred group are gentamicin C1a, gentamicin $C_2$, gentamicin C2a, sisomicin and verdamicin. A convenient method of carrying out our improvement process comprises stirring together at room temperature a solution of an aminoglycoside (e.g., sisomicin) in an inert non-reactive organic solvent (e.g., benzene), with an excess of an aldehyde (e.g., benzaldehyde) until the starting aminoglycoside has all reacted as evidenced by thin layer chromatography. The per-N-Schiff base-oxazolidine derivative thereby prepared (e.g. 1,3,2,',6'-tetra-N-benzylidene-3'',4''-N,O-benzylidenesisomicin) is easily isolated as a white solid by evaporation of the solvent, purified by known techniques such as crystallization or chromatography, and then converted to the corresponding 2''-O-hydrocarbonsulfonate ester (preferably the 2''-O-methanesulfonate) in the manner disclosed hereinabove and in the examples. The Schiff base-oxazolidine protecting groups are then conveniently removed in dilute acid, any mineral acid being suitable, particularly sulfuric acid, perchloric acid, and preferably hydrochloric acid. Usually, the 2''-O-hydrocarbonsulfonyl-per-N-ylidene-aminoglycoside (e.g., 2''-O-methanesulfonyl-1,3,2',6'-tetra-N-benzylidene-3'',4''-N,O-benzylidenesisomicin) is dissolved in a lower alkanol (e.g., methanol) and an excess quantity of dilute acid is added and the reaction mixture stirred at room temperature for several hours with the pH of the reaction mixture being between 1 and 5. The solution containing the 2'''-O-hydrocarbonsulfonylaminoglycoside free of N-protecting groups (e.g., 2''-O-methanesulfonylsisomicin) is evaporated, and the residue purified by chromatography, such as column chromatography over silica gel eluting with the lower phase of a 2:1:1 mixture of chloroform-methanol-15 percent ammonium hydroxide. In this preferred species, under the foregoing conditions, the 2''-O-hydrocarbonsulfonyl-aminoglycoside spontaneously transforms to a 2'',3''-epimino-amino-glycoside of formula II(a and b), e.g., 2''-deoxy-3''-desmethylamino-2'',3''-N-methylepiminosisomicin.

In our improvement process, the 2''-O-hydrocarbonsulfonate ester of choice is usually the 2''-methanesulfonate ester; however, the 2''-p-toluenesulfonate ester is preferred when converting gentamicin $C_1$ to 2''-deoxy-3''-desmethylamino-2'',3''-N-methylepimino-gentamicin $C_1$ by our improved process. Gentamicin $C_1$ has a secondary amino function at C-6' which does not form a stable aldehyde addition compound. Thus, upon condensation with an aldehyde, e.g. benzaldehyde, gentamicin $C_1$ is converted to 1,3,2-

'-tri-N-benzylidene-3'',4'''-N,O-benzylidenegentamicin C$_1$ with the secondary amine at C-6' unprotected. Treatment of the foregoing derivative with 2.2 moles of p-toluenesulfonyl chloride per mole of aminoglycoside derivative yields the desired 2'''-O-p-toluenesulfonylaminoglycoside with the 6'-amino function masked by a p-toluenesulfonyl group, i.e, to 6',2'''-di-N,O-p-toluenesulfonyl-1,3,2'-tri-N-benzylidene-3'',4'''-N,O-benzylidenegentamicin C$_1$. Upon treatment with dilute aqueous acid according to our process, the per-N-benzylidene groups are removed and the 2'''-O-sulfonate ester derivative is eliminated by ring closure with the N-sulfonyl protecting group remaining to form 2'''-deoxy-3'''-desmethylamino-2''',3'''-N-methyllepimino-6'-N-p-tolu-enesulfonylgentamicin C$_1$. The 6'-p-toluenesulfonyl group is then conveniently removable via electrochemical reduction.

The process of our invention shown in Chart A is illustrated in detail hereinbelow in the examples which should not be construed as limiting the invention in spirit or in scope.

Preparation 1

Schiff base-oxazolidine-aminoglycoside Derivatives

A. Per-N-benzylideneaminoglycosides 1. 1,3,2',6'-tetra-N-benzylidene-3'',4'''-N,O-benzylidenesisomicin Add 5.65 ml. of benzaldehyde to 5 g. of sisomicin in 100 ml. of dry benzene. Stir together at room temperature until no starting material (sisomicin) is present as evidenced by thin layer chromatography (about 21 hours reaction time). Evaporate the benzene followed by drying in vacuo to give a residue (8.91g.) comprising 1,3,2',6'-tetra-N-benzylidene-3'',4'''-N,O-benzylidenesisomicin. Purify by crystallization from chloroform-hexane as follows: dissolve a sample of the foregoing pentabenzylidene derivative in a minimum of chloroform and add hexane to incipient turbidity. Allow the solution to stand until crystallization appears complete, then filter and dry the resultant crystalline precipitate comprising the purified pentabenzylidenesisomicin, m.p. = 123–126°C; $[\alpha]^{26°}_D + 42°$ (0.3 percent in chloroform).

2. In a manner similar to that described in Preparation 1A (1), treat each of the following aminoglycosides with benzaldehyde in dry benzene:

gentamicin C$_1$,
gentamicin C$_{1a}$,
gentamicin C$_2$,
gentamicin C$_{2a}$,
verdamicin,
Antibiotic JI-20-A,
Antibiotic JI-20-B,
gentamicin B,
gentamicin B$_1$,
Antibiotic G-418,
tobramycin,
3',4'-dideoxykanamycin B, and
gentamicin X$_2$.

Isolate and purify each of the resultant products in a manner similar to that described in Preparation 1A(1) to obtain respectively:

1,3,2'-tri-N-benzylidene-3'',4'''-N,O-benzylidenegentamicin C$_1$, 1,3,2',6'-tetra-N-benzylidene-3'',4'''-N,O-benzylidene-gentamicin C$_{1a}$, 1,3,2',6'-tetra-N-benzylidene-3'',4'''-N,O-benzylidenegentamicin C$_2$, m.p. = 205.5–212.2°C; $[\alpha]^{26°}_D$ −16.8(0.3 percent in chloroform), 1,3,2',6'-tetra-N-benzylidene-3'', 4''-N,O-benzylidenegentamicin C$_{2a}$, 1,3,2',6'-tetra-N-benzylidene-3'',4'''-N,O-benzylideneverdamicin, 1,3,2',6'-tetra-N-benzylidene-3'',4'''-N,O-benzylidene-Antibiotic JI-20-A, 1,3,2',6'-tetra-N-benzylidene-3'',4'''-N,O-benzylidene-Antibiotic JI-20-B, 1,3,6'-tri-N-benzylidene-3'',4'''-N,O-benzylidenegentamicin B, 1,3,6'-tri-N-benzylidene-3'',4'''-N,O-benzylidene-gentamicin B$_1$, 1,3,2'-tri-N-benzylidene-3',4''N,O-benzylidene-Antibiotic G-418, 1,3,2',6'3''-penta-N-benzylidene tobramycin, 1,3,2',6'3''-penta-N-benzylidene-3',4''-dideoxy-kanamycin B, and 1,3,2'-tri-N-benzylidene-3'',4'''-N,)-benzylidenegentamicin X$_2$.

B. Other Schiff base-Oxazolidine Derivatives

1. In the procedure of Preparation 1A(1) in place of benzaldehyde there may be substituted other aldehydes such as propionaldehyde, p-chlorobenzaldehyde or 1-naphthaldehyde and there is obtained the corresponding per-N-ylidene derivative, i.e., 1,3,2',6'-tetra-N-propylidene-3'',4'''-N,O-propylidenesisomicin, 1,3,2',6'-tetra-N-p-chlorobenzylidene-3'',4'''-N,O-p-chlorobenzylidene-sisomicin, and 1,3,2',6'-tetra-N-naphthylidene-3'',4'''-N,O-naphthyli-denesisomicin, respectively.

2. In similar manner to that described in Preparation 1A (2), by substituting for benzaldehyde other aldehydes such as propionylaldehyde, p-chlorobenzaldehyde or 1-napthaldehyde there is obtained the corresponding Schiff base-oxazolidine derivative respectively for each of the aminoglycoside starting compounds listed therein.

Preparation 2

O-Benzylidene-per-N-benzylideneaminoglycosides

A. O-Benzylidene-per-N-benzylideneaminoglycosides 1. b 4'',6''-O-Benzylidene-1,3,2',6',3''-benzylidenetobramycin To a solution of 5g. of 1,3,2',6',3''-penta-N-benzylidene-tobramycin in 25 ml. of anhydrous dimethylformamide add 1 ml. of benzaldehyde and 300 mg. of dry p-toluenesulfonic acid. Heat in a sealed flask at 110°C for 4 hours, cool the solution, then treat the cooled solution with 6 ml. of Amberlite IR-401S resin in the hydroxide form. Filter off the resin and evaporate the filtrate in vacuo to a residue comprising 4'',6''-O-benzylidene-1,3,2',6',3''-penta-N-benzylidenetobramycin which can be used without further purification as an intermediate in the process set forth hereinbelow in the examples.

A purified sample is prepared by crystallization in a manner similar to that described in Preparation 1A(1).

2. Treat the following per-N-benzylideneaminoglycosides with benzaldehyde and dry p-toluenesulfonic acid in dimethylformamide in the manner described in Preparation 2A(1):

1,3,2',6',3''-penta-N-benzylidene-3',4'-dideoxykanamycin B, 1,3,2',6'-tetra-N-benzylidene-3'',4''-N,O-benzylidene-Antibiotic JI-20-A,
1,3,2',6'-tetra-N-benzylidene-3'',4''-N,O-benzylidene-Antibiotic JI-20-B,
1,3,2'-tri-N-benzylidene-3'',4''-N,O-benzylidene-Antibiotic G-14418,
1,3,2'-tri-N-benzylidene-3'',4''-N,O-benzylidenegentamicin $X_2$,
1,3,6'-tri-N-benzylidene-3'',4''-N,O-benzylidenegentamicin B, and
1,3,6'-tri-N-benzylidene-3'',4''-N,O-benzylidenegentamicin $B_1$.

Isolate and purify each of the above resulting products in a manner similar to that described in Preparation 2A (1) to obtain respectively:
4'',6''-O-benzylidene-1,3,2',6',3''-penta-N-benzylidene-3',4'-dideoxykanamycin B,
3',4'-O-benzylidene-1,3,2',6'-tetra-n-benzylidene-3'',4''-N,O-benzylidene-Antibiotic JI-20-A,
3',4'-O-benzylidene-1,3,2',6'-tetra-N-benzylidene-3'',4''-N,O-benzlidene-Antibiotic JI-20-B,
4',6'-O-benzylidene-1,3,2'-tri-N-benzylidene-3'',4''-N,O-benzylidene Antibiotic G-418,
4',6'-O-benzylidene-1,3,2'-tri-N-benzylidene-3'',4''-N,O-benzylidenegentamicin $X_2$,
a mixture comprising 2',3'(and 3',4')-O-benzylidene-1,3,6'-tri-N-benzylidene-3'',4''-N,O-benzylidenegentamicin B, and
a mixture comprising 2',3'(and 3',4')-O-benzylidene-1,3,6'-tri-N-benzylidene-3''4''-N,O-benzylidenegentamicin $B_1$.

EXAMPLE 1

2''-O-Hydrocarbonsulfonyl-per-N-Ylideneaminoglycosides

A. 2''-O-methanesulfonyl-1,3,2',6'-tetra-N-benzylidene-3'',4''-N,O-benzylidenegentamicin $C_2$ 1. Dissolve 0.5 g. of 1,3,2',6'-tetra-N-benzylidene-3'',4''-N,O-benzylidenegentamicin $C_2$ in 10 ml. of dry pyridine and evaporate the pyridine in vacuo to a residue. Repeat this process with an additional 10 ml. of dry pyridine. Then dissolve the resultant dry residue in 5 ml. of dry pyridine and add dropwise a solution of 0.05 ml. of methanesulfonyl chloride in 5 ml. of pyridine. Stir the reaction mixture at room temperature for 16 hours, then evaporate in vacuo to a residue comprising 2''-O-methanesulfonyl-1,3,2',6'-tetra-N-benzylidene-3'',4''-N,O-benzylidenegentamicin $C_2$ which can be used without further purification as an intermediate in the procedure of Example 2A.

2. In the above procedure, by substituting for per-N-benzylidenegentamicin $C_2$ other per-N-ylidene derivatives of gentamicin $C_2$, there is obtained the corresponding 2''-O-methane-sulfonyl ester, e.g., by treating 1,3,2',6'-tetra-N-propylidene-3'',4''-N,O-propylidenegentamicin $C_2$ with methanesulfonyl chloride in pyridine there is obtained 2''-O-methanesulfonyl-1,3,2',6'-tetra-N-propylidene-3'',4''-N,O-propylidenegentamicin $C_2$.

B. In a manner similar to that described in Example 1A, treat each of the following per-N-benzylideneaminoglycosides with methanesulfonyl chloride in pyridine:
1,3,2',6'-tetra-N-benzylidene-3'',4''-N,O-benzylidene-sisomicin,
1,3,2',6'-tetra-N-benzylidene-3'',4''-N,O-benzylidene-gentamicin $C_{1a}$,
1,3,2',6'-tetra-N-benzylidene-3'',4''-N,O-benzylidenegentamicin $C_{2a}$,
1,3,2',6'-tetra-N-benzylidene-3'',4''-N,O-benzylideneverdamicin.

Isolate and purify each of the respective products in a manner similar to that described in Example 1A to obtain:
2''-O-methanesulfonyl-1,3,2',6'-tetra-N-benzylidene-3'',4''-N,O-benzylidenesisomicin,
2''-O-methanesulfonyl-1,3,2',6'-tetra-N-benzylidene-3'',4''-N,O-benzylidenegentamicin $C_{1a}$,
2''-O-methanesulfonyl-1,3,2',6'-tetra-N-benzylidene-3'',4''-N,O-benzylidenegentamicin $C_{2a}$,
2''-O-methanesulfonyl-1,3,2',6'-tetra-N-benzylidene-3'',4''-N,O-benzylideneverdamicin.

In similar manner, other per-N-ylideneaminoglycosides may be used in place of the per-N-benzylidene derivatives in the procedure of Example 1B and there is obtained the corresponding 2''-O-methanesulfonyl-per-N-ylidene derivative, e.g., treatment of 1,3,2',6'-tetra-N-p-chlorobenzylidene-3'',4'-N,O-p-chlorobenzylidenesisomicin with methanesulfonyl chloride in pyridine yields 2''-O-methanesulfonyl-1,3,2',6'-tetra-N-p-chlorobenzylidene-3'',4''-N,O-p-chlorobenzylidenesisomicin.

C. 2''-O-methanesulfonyl-O-benzylidene-per-N-benzylideneaminoglycosides

In a manner similar to that described in Example 1A treat each of the following O-benzylidene-per-N-benzylideneaminoglycosides with methanesulfonyl chloride in pyridine:
4'',6''-O-benzylidene-1,3,2',6',3''-penta-N-benzylidenetobramycin,
4'',6''-o-benzylidene-1,3,2',6',3''-penta-N-benzylidene-3',4'-dideoxykanamycin B,
3',4'-O-benzylidene-1,3,2',6'-tetra-N-benzylidene-3'',4''-N,O-benzylidene-Antibiotic JI-20-A,
3',4'-O-benzylidene-1,3,2',6'-tetra-N-benzylidene-3'',4''-N,O-benzylidene-Antibiotic JI-20-B,
4',6'-O-benzylidene-1,3,2'-tri-N-benzylidene-3'',4''-N,O-benzylidene-Antibiotic G-418.
4',6'-O-benzylidene-1,3,2'-tri-N-benzylidene-3'',4''-N,O-benzylidenegentamicin $X_2$,
a mixture comprising 2',3'(and 3',4')-O-benzylidene-1,3,6'-tri-N-benzylidene-3'',4''-N,O-benzylidenegentamicin B, and
a mixture comprising 2',3'(and 3',4')-O-benzylidene-1,3,6'-tri-N-benzylidene-3'',4''-N,O-benzylidenegentamicin $B_1$.

Isolate each of the respective products in a manner similar to that described in Example 1A to obtain the following 2''-O-methanesulfonyl derivatives:
2''-O-methanesulfonyl-4'',6''-O-benzylidene-1,3,2',6',3''-penta-N-benzylidenetobramycin,
2''-O-methanesulfonyl-4'',6''-O-benzylidene-1,3,2',6',3''-penta-N-benzylidene-3',4'-dideoxykanamycin B,
2'-O-methanesulfonyl-3',4'-O-benzylidene-1,3,2',6'-tetra-N-benzylidene-3'',4''-N,O-benzylidene-Antibiotic JI-20-A,
2''-O-methanesulfonyl-3',4'-O-benzylidene-1,3,2',6'-tetra-N-benzylidene-3'',4''-N,O-benzylidene-Antibiotic JI-20-B, 2'''-O-methanesulfonyl-4',6'-O-benzylidene-1,3,2'-tri-N-benzylidene-3'',4''-N,O-benzylidene-Antibiotic G-418, 2'''-O-methanesulfonyl-4',6'-O-benzylidene-1,3,2'-tri-N-benzylidene-3'',4''-N,O-benzylidenegentamicin $X_2$, a mixture comprising 2'''-O-methanesulfonyl-2',3'(and 3',4')-O-benzylidene-1,3,6'-tri-N-benzylidene-3'',4''-N,O-benzylidenegentamicin B, and a mixture comprising 2'''-O-methanesulfonyl-2',3'(and 3',4')-O-benzylidene-1,3,6'-tri-N-benzylidene-3'',4''-N,O-benzylidene-gentamicin $B_1$, respectively.

D. 2'''-O-methanesulfonyl-O-triphenylmethyl-per-N-benzylidene derivatives of aminoglycosides having a primary hydroxyl group 1. Dissolve 9.1 g. of 1,3,2',6',3''-penta-N-benzylidene-tobramycin in 100 ml. of dry pyridine. Evaporate the pyridine to remove any trace of water, then repeat this process. Dissolve the dried residue in 75 ml. of pyridine and at room temperature, add 3 g. of triphenylmethyl chloride. Shake the mixture until all the triphenylmethyl chloride has dissolved and then allow the reaction mixture to stand at room temperature for 5 days. To the resulting solution of 6'''-O-triphenylmethyl-1,3,2',6',3''-penta-N- benzylidenetobramycin, add 1.75 g. of methanesulfonyl chloride and allow the mixture to stand an additional 24 hours. Evaporate the pyridine in vacuo to a residue comprising 2'''-O-methanesulfonyl- 6'''-O-triphenylmethyl-1,3,2',6',3''-penta-N-benzylidenetobramycin which is used without further purification in the procedure of Example 2.

2. In a manner similar to that described in Example 1D(1), treat each of the 1,3,2',6',3''-penta-N-benzylidene-3',4'-dideoxy-kanamycin B and 1,3,2'-tri-N-benzylidene-3'',4''-N,O-benzylidene-gentamicin $X_2$ with triphenylmethyl chloride in dry pyridine followed by treatment of the resultant O-triphenylmethyl ether derivatives with methanesulfonyl chloride in pyridine to obtain 2'''-O-methanesulfonyl-6'''-O-triphenylmethyl-1,3,2',6',3''-penta-N- benzylidene-3',4'-dideoxykanamicin B and 2'''-O-methanesulfonyl-6'-O-triphenylmethyl-1,3,2'-tri-N-benzylidene-3'',4''-N,O-benzylidene-gentamicin $X_2$, respectively.

E. 2'''-O-p-toluenesulfonyl-N-benzylideneaminoglycosides

In the procedures of Examples 1A, 1B, 1C, and 1D, by substituting an equivalent quantity of p-toluenesulfonyl chloride for methanesulfonyl chloride, there is obtained the corresponding 2'''-O-p-toluenesulfonyl-per-N-benzylideneaminoglycoside.

F. 2'',6'-Di-O,N-p-toluenesulfonyl-1,3,2'-tri-N-benzylidene 3'',4''-N,O-benzylidenegentamicin $C_1$ Dissolve 1,3,2'--tri-N-benzylidene-3'',4''-N,O-benzylidene-gentamicin $C_1$ (1 g.) in dry pyridine (75 ml.). Distill the pyridine in vacuo, then repeat this procedure twice more with 75 ml. portions of dried pyridine to thoroughly dry the N-benzylidene derivative. Dissolve the dried N-benzylidene derivative in 35 ml. of dry pyridine, add 0.88 g. of p-toluene-sulfonyl chloride (2.2 moles per mole of gentamicin $C_1$) and allow the reaction mixture to stand at room temperature 3 hours. Add 50 ml. of methanol and evaporate the filtrate in vacuo to a residue comprising 2'',6'-di-O,N-p-toluenesulfonyl-1,3,2'-tri-N-benzylidene-3'',4''-N,O-benzylidenegentamicin $C_1$. This material can be used without further purification in the next step.

EXAMPLE 2

2''-deoxy-3''-desamino (or desmethylamino)-2'',3''-epimino (or N-methylepimino)-aminoglycosides A. 2''-deoxy-3''-desmethylamino-2'',3''-N-methylepiminogentamicin $C_2$ The starting compound of this example is the 2''-O-methyanesulfonyl-1,3,2',6'-tetra-N-benzylidene-3'',4''-N,O-benzylidene-gentamicin $C_2$ prepared from 0.5 g. of 1,3,2',6'-tetra-N-benzylidene-3'',4''-N,O-benzylidenegentamicin $C_2$ as described in Preparation 1A(1).

Dissolve the foregoing 2''-O-methanesulfonyl-per-N-benzylidenegentamicin $C_2$ in 15 ml. of methanol, add 1.5 ml. of 0.1N hydrochloric acid and stir at room temperature for 6 hours. Dilute the solution with 15 ml. of water and add 0.1N hydrochloric acid until the pH of the reaction mixture is 4.8 (about 8.5 ml. of 0.1N hydrochloric acid are usually added). Stir the acidic reaction mixture at room temperature for 16 hours then extract the solution with 15 ml. of ether and discard the ether extracts. Evaporate the aqueous layer to a residue comprising the hydrochloride of 2''-deoxy-3''-desmethylamino-2'',3''-N-methyl-epiminogentamicin $C_2$. Purify by chromatography over silica gel eluting with the lower phase of a 2:1:1 mixture of chlorofrom-methanol-15 percent ammonium hydroxide. Assay the eluate fractions by thin layer chromatography and combine the like appropriate fractions. Evaporate the combined eluates to a residue comprising purified 2''-deoxy-3''-desmethylamino-2'',3''-N-methyl-epiminogentamicin $C_2$ exhibiting the following data: nuclear magnetic resonance (60 $MH_2$, $CDCl_3$), $\delta 1.05$ (doublet, 3H, J=6.5Hz, CH—$CH_3$), 1.27 (singlet, 3H, C—$CH_3$), $\delta 2.42$ (singlet, 3H, N—$CH_3$) 5.08 (doublet, 2J=3.75Hz, anomeric proton), $\delta 5.24$ (singlet, 1H, anomeric proton); mass spectral peaks at $m/e$ 446 ([M+1]+), 333, 332, 316, 314, 305, 304, 286, 287 (pseudodisaccharide ions), 143, 142 (monosaccharide ions), 191, 173, 163, 145 (2-deoxystreptamine ions).

In the above procedure in place of the 2''-O-methanesulfonyl starting compound there may be used the corresponding 2''-O-p-toluenesulfonyl ester, i.e., 2''-O-p-toluenesulfonyl-1,3,2',6'-tetra-N-benzylidene-3'',4''-N,O-benzylidenegentamicin $C_2$ and there is obtained the same product, i.e., 2''-deoxy-3''-desmethylamino-2'',3''-N-methylepiminogentamicin $C_2$.

B. In similar manner treat each of the 2''-O-methanesulfonyl-oxazolidine-benzylideneaminoglycosides prepared as described in Examples 1B, 1C and 1D with hydrochloric acid in methanol followed by chromatography as described hereinabove to obtain the corresponding 2''-deoxy-3''-desamino-2'',3''-epiminoaminoglycoside intermediate, i.e.:

2''-deoxy-3''-desmethylamino-2'',3''-N-methylepiminosisomicin,

2''-deoxy-3''-desmethylamino-2'',3''-N-methylepiminogentamicin $C_{1a}$,

2''-deoxy-3''-desmethylamino-2'',3''-N-methylepiminogentamicin $C_{2a}$,

2''-deoxy-3''-desmethylamino-2'',3''-N-methylepiminoverdamicin,

2''-deoxy-3''-desamino-2'',3''-epiminotobramycin,

3',4',2''-trideoxy-3''-desamino-2'',3''-epiminokanamycin B,

2''-deoxy-3''-desmethylamino-2'',3''-N-methylepimino-Antibiotic JI–20 –A,

2''-deoxy-3''-desmethylamino-2'',3''-N-methylepimino-Antibiotic JI–20–B,

2''-deoxy-3''-desmethylamino-2'',3''-N-methylepimino-Antibiotic G–418,

2''-deoxy-3''-desmethylamino-2'',3''-N-methylepimino- gentamicin $X_2$,

2''-deoxy-3''-desmethylamino-2'',3''-N-methylepiminogentamicin B,

2''-deoxy-3''-desmethylamino-2'',3''-N-methylepiminogentamicin $B_1$,

2''-deoxy-3''-desamino-2'',3''-epiminotobramycin,

3''-desamino-2'',3''-epimino-3',4',2''-trideoxykanamycin B, and

2''-deoxy-3''-desmethylamino-2'',3''-N-methylepiminogentamicin $X_2$, respectively.

In the above procedure in place of the 2''-O-methanesulfonylaminoglycoside intermediates there may be used the corresponding 2''-O-p-toluenesulfonylaminoglycosides as starting compounds.

C. 2''-deoxy-3''-desmethylamino-2'',3''-N-methylepiminogentamicin $C_1$ 1. 6'-N-p-toluenesulfonyl-2''-deoxy-3''-desmethylamino-2'',3''-N-methylepiminogentamicin $C_1$ In a manner similar to that described in Examle 2A, treat 6'-N-p-toluenesulfonyl-2''-O-p-toluenesulfonyl-1,3,2'-tri-N-benzylidene-3'',4''-N,O-benzylidenegentamicin $C_1$ with sufficient hydrochloric acid in methanol so that the pH of the reaction mixture is in the range of from 1 to 5. Stir the acidic reaction mixture at room temperature for 16 hours, then isolate and purify the resultant product in a manner similar to Example 2A to obtain 2''-deoxy-3''-desmethylamino-6'-N-p-toluenesulfonyl-2'',3''-N-methylepiminogentamicin $C_1$.

2. Electrochemical reduction of the 6'-N-p-toluenesulfonyl group

Dissolve 2.45 g. of 2''-deoxy-3''-desmethylamino-6'-N-p-toluenesulfonyl-2'',3''-N-methylepiminogentamicin $C_1$ in 70 ml. of 0.85 M solution of tetramethylammonium chloride in methanol/water (1:1). Electrolyze the solution with stirring at 1.0 amperes using a mercury cathode and a graphite anode in an RA84 alundum thimble containing water (5 ml.). Electrolyze until thin layer chromatographic analysis of an aliquot of the solution indicates complete disappearance of starting material. Evaporate the solution to a small volume and apply the resultant residue to a column of Amberlite IRC 150 resin ($NH_4115^{\oplus}$ cycle). Wash the column with three volumes of water, then elute with a gradient of ammonium hydroxide (O $\rightarrow$0.5N). Assay the eluates by thin layer chromatography and evaporate the combined like fractions to a residue comprising 2''-deoxy-3''-desmethylamino-2'',3''-N-methylepiminogentamicin $C_1$.

We claim:

1. In the process for preparing a 2''-deoxy-3''-desamino-2'',3''-epimino-4,6-di-(aminoglycosyl)-2-deoxystreptamine wherein an antibacterially active 4,6-di- ( aminoglycosyl) -2-deoxystreptamine having a 2''-hydroxy function and a 3''-primary or secondary amino function, the primary and secondary amino groups of which are protected by carbobenzyloxy groups, and primary and secondary hydroxyl groups of which are converted to a triphenylmethyl ether of a primary hydroxyl group or a cyclic ketal or acetal of protectable neighboring hydroxyl groups, is treated with a hydrocarbonsulfonyl halide in a tertiary amine, the thereby formed 2''-O-hydrocarbonsulfonyl-per-N-carbobenzyloxy 4,6-di-(aminoglycosyl)-2-deoxystreptamine is treated with hydrogen in the presence of a catalyst, or with an alkali metal in liquid ammonia, whereby the N-carbobenzyloxy groups are removed; and the resulting 2''-O-hydrocarbonsulfonyl 4,6-di-(aminoglycosyl)-2-deoxystreptamine is converted to a 2''-deoxy-3''-desamino-2'',3''-epimino 4,6-di-(aminoglycosyl)-2-deoxystreptamine by spontaneous transformation or by heating in a lower alkanol alone or together with an alkali metal salt of said alkanol;

the improvement which comprises protecting primary amino groups and secondary amino groups capable of oxazolidine formation with an aldehyde and a neighboring hydroxyl group in said antibacterial active 4,6-di-(aminoglycosyl)-2-deoxystreptamine by Schiff base-oxazolidine condensation products with an aldehyde devoid of hydroxyl groups; and, after preparation of the 2''-O-hydrocarbonsulfonyl ester thereof, treating the resulting 2''-O-hydrocarbonsulfonyl 4,6-di-(aminoglycosyl)-2-deoxystreptamine having N-protecting-Schiff base -oxazolidine groups with dilute aqueous acid to a pH in the range of from about 1 to about 5, whereby said N-protecting Schiff base-oxazolidine groups are removed.

2. The process of claim 1 including the step of isolating the product thereby formed.

3. The process of claim 1 wherein the N-protecting Schiff base-oxazolidine groups of said 4,6-di-(aminoglycosyl)-2-deoxystreptamine are derived from benzaldehyde, and the dilute aqueous acid treatment of said 2''-O-hydrocarbonsulfonyl ester is carried out with dilute hydrochloric acid.

4. The process of claim 3 including the step of isolating the product thereby formed.

5. The process according to claim 1 wherein said antibacterially active 4,6-di-(aminoglycosyl)-2-deoxystreptamine having a 2''-hydroxy function and a 3''-primary or secondary amino function is a member selected from the group consisting of gentamicin B, gentamicin $B_1$, gentamicin C1a, gentamicin $C_2$, gentamicin C2a, gentamicin $X_2$ and mixtures of the foregoing, sisomicin, verdamicin, robramycin, 3', 4'-dideoxykanamycin B, Antibiotic JI–20A, Antibiotic JI-–20B and Antibiotic G–418.

6. The process of claim 1 wherein said antibacterially active 4,6-di-(aminoglycosyl)-2-deoxystreptamine having a 2''-hydroxyl function and a 3''-primary or secondary amino function is a member selected from the grup consisting of gentamicin $C_{1a}$, gentamicin $C_2$, gentamicin $C_{2a}$, verdamicin and sisomicin.

7. The process according to claim 1 wherein said antibacterially active 4,6-di-(aminoglycosyl)-2-deoxystreptamine having a 2''-hydroxy function and a 3''-primary or secondary amino function is a member selected from the group consisting of gentamicin B, gentamicin $B_1$, gentamicin $C_{1a}$, gentamicin $C_2$, gentamicin $C_{2a}$, gentamicin $X_2$ and mixtures of the foregoing, sisomicin, verdamicin, tobramycin, 3',4'-dideoxykanamycin B, Antibiotic JI-20A, Antibiotic JI-20B and Antibiotic G-418, wherein the N-protecting Schiff base-oxazolidine groups are derived form benzaldehyde, and wherein the dilute aqueous acid treatment of said 2''-O-hydrocarbonsulfonyl ester is carried out with dilute hydrochloric acid.

8. The process according to claim 1 wherein said antibacterially active 4,6-di-(aminoglycosyl)-2-deoxystreptamine having a 2''-hydroxy function and a 3''-primary or secondary amino function is a member selected from the group consisting of gentamicin $C_{1a}$, gentamicin $C_2$, gentamicin $C_{2a}$, verdamicin and sisomicin, wherein the N-protecting -Schiff base-oxazolidine groups are derived from benzaldehyde, and wherein the dilute aqueous acid treatment of said 2''-O-hydrocarbonsulfonyl ester is carried out with dilute hydrochloric acid.

9. The process of claim 1 wherein said 4,6-di-(aminoglycosyl)-2-deoxystreptamine having a 2''-hydroxy function and a 3''-primary or secondary amino function is gentamicin $C_2$, wherein the N-protecting-Schiff base-oxazolidine groups are derived from benzaldehyde, wherein the hydrocarbonsulfonyl halide in a tertiary amine is methanesulfonyl chloride in pyridine, and wherein the dilute aqueous acid treatment is carried out in dilute hydrochloric acid, said process comprising treating 1,3,2',6'-tetra-N-benzylidene-3'',4''-N,O-benzylidene-gentamicin $C_2$ with methanesulfonyl chloride in pyridine and treating the thereby formed 2''-O-methanesulfonyl-1,3,2',6'-tetra-N-benzylidene-3'',4''-N,O-benzylidene-gentamicin $C_2$ with dilute hydrochloric acid.

10. The process of claim 9 including the step of isolating the 2''-deoxy-3''-desmethylamino-2'',3''-N-methylepiminogentamicin $C_2$ thereby formed.

11. The process according to claim 1 wherein the N-protecting-Schiff base-oxazolidine groups of said 4,6-di-(aminoglycosyl)-2-deoxystreptamine are derived from benzaldehyde and the protectable primary and secondary hydroxyl groups of said 4,6-di-(aminoglycosyl)-2-deoxystreptamine are converted to a cyclic acetal with benzaldehyde, said improvement process comprising protecting the primary amino groups and secondary amino groups capable of oxazolidine formation with an aldehyde and a neighboring hydroxyl groups in an antibacterially active 4,6-di-(aminoglycosyl)-2-deoxystreptamine having a 2''-hydroxyl function and a 3''-primary or secondary amino function, by Schiff base-oxazolidine condensation products with benzaldehyde, and converting the protectable primary and secondary hydroxyl groups of said 4,6-di-(aminoglycosyl)-2-deoxystreptamine to cyclic acetals with benzaldehyde, treating said per-N-benzylidene-O-benzylidene 4,6-di-(aminoglycosyl)-2-deoxystreptamine with a hydrocarbonsulfonyl halide having up to eight carbon atoms in a tertiary amine, treating the resulting O-benzylidene-per-N-benzylidene-2''-O-hydrocarbonsulfonyl-4,6-di-(aminoglycosyl)-2-deoxystreptamine with dilute aqueous acid to a pH in the range of from about 1 to about 5, whereby said O-benzylidene acetal groups and said N-benzylidene Schiff base oxazolidine groups are removed.

12. A compound selected from the group consisting of a 2''-O-hydrocarbonsulfonyl derivative of the following structural formulae I(a), I(b) and I(c):

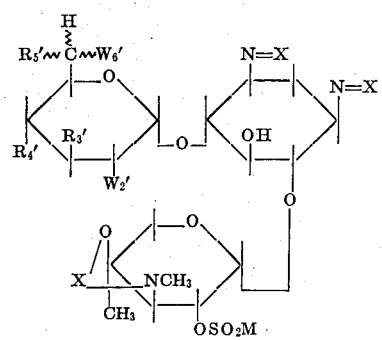

I(a)

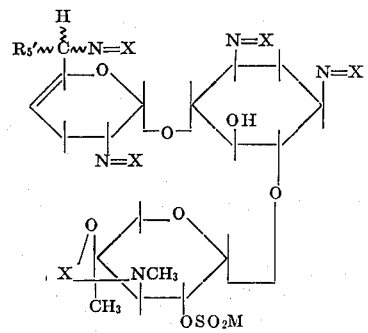

I(b)

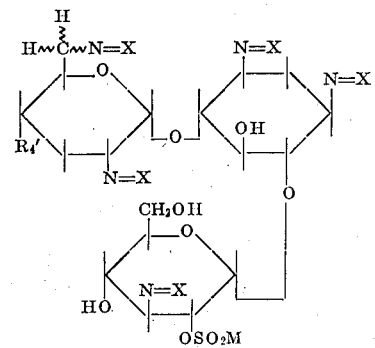

I(c)

wherein M is a hydrocarbon having up to 8 carbon atoms, $R'_3$ and $R'_4$ are each members selected from the group consisting of hydrogen and hydroxy, $R'_5$ is a member selected from the group consisting of hydrogen and methyl; $W'_2$ is a member selected from the group consisting of hydroxy and $-N=X$; $W'_6$ is a member selected from the group consisting hydroxy, $-N=X$ and

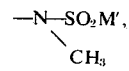

M' being an aryl radical having up to 8 carbon atoms; X is an organic radical devoid of hydroxyl groups and bonded to the amino and oxygen group through a bivalent carbon radical; th cyclic ketals and cyclic acetals thereof devoid of hydroxyl groups; and when $R'_5$ is hydrogen and $W'_6$ is hydroxy, the 6'-O-triphenylmethyl derivatives thereof, and the 6''-O-triphenylmethyl derivatives of compounds of formula I(c).

13. A compound according to claim 12, formulae I(a) and I(b) wherein M is methyl and X is benzylidene.

14. A compound according to claim 12 formula I(a) wherein M is methyl, X is benzylidene, $W'_2$ and $W'_6$ are $-N=X$; $R'_3$ and $R'_4$ are hydrogen, $R'_5$ is methyl; the sterochemistry at $C'_6$ being R; said compound being 1,3,2',6'-tetra-N-benzylidene-3'',4''-N,O-benzylidene-2''-O-methanesulfonylgentamicin $C_2$.

* * * * *

UNITED STATES PATENT OFFICE
CERTIFICATE OF CORRECTION

Page 1 of 3

Patent No. 3,868,360                    Dated  February 25, 1975

Inventor(s) Peter J. L. Daniels and Jay Weinstein

It is certified that error appears in the above-identified patent and that said Letters Patent are hereby corrected as shown below:

Page 1, Title, "PROCESS FOR PREPARING 2-DEROXY-3-DESAMINO-2,3-EPIMINO-AMINOGLYCOSIDES AND INTERMEDIATES USEFUL THEREIN" should read ---PROCESS FOR PREPARING 2"-DEOXY-3"-DESAMINO-2",3"-EPIMINO-AMINOGLYCOSIDES AND INTERMEDIATES USEFUL THEREIN---. Column 1, lines 1 - 5, the title appears incorrectly as in Page 1. Column 1, lines 5 - 10, United States Patent Office repeated the last paragraph of the abstract. Column 3, line 65, "gentamicin $C_1A$" should read ---gentamicin $C_{1a}$,---.

Column 5, lines 11 - 12, "include cylcopropylidene," should read ---include cyclopropylidene,---. Column 5, line 65, "-benzylidene-gentamicin C1a" should read --- -benzylidene-gentamicin $C_{1a}$---. Column 6, line 6, "-benzylidene-gentamicin C2a" should read --- -benzylidene-gentamicin $C_{2a}$---. Column 6, lines 38 - 39, "-1,3,2'-tetra-N-benzylidene-3"-" should read --- -1,3,2',6'-tetra-N-benzylidene-3",4"- ---. Column 6, line 58, "gentamicin C1a" should read ---gentamicin $C_{1a}$---. Column 6, line 59, "gentamicin C2a," should read ---gentamicin $C_{2a}$,---. Column 7, line 31, "analogs therof having" should read ---analogs thereof having---. Column 8, line 13, "-gentamicin C1a" should read ---gentamicin $C_{1a}$---. Column 8, line 15, "-gentamicin C2," should read --- -gentamicin $C_2$,---. Column 8, line 19, "-gentamicin X2, and" should read --- -gentamicin $X_2$, and---. Column 8, line 39, "-double in" should read --- -double bond in---. Column 11, lines 6 - 7, "gentamicin C1a, gentamicin C2, gentamicin C2a" should read ---gentamicin $C_{1a}$, gentamicin $C_2$, gentamicin $C_{2a}$---. Column 11, line 16, "micin C2a are" should read ---gentamicin $C_{2a}$ are---. Column 11, line 21, "C2a being" should read ---$C_{2a}$ being---. Column 11, lines 26 - 28, "gentamicin C2a, as well as the stereoconfiguration about C-6' of gentamicin $C_2$ and C2a" should read ---gentamicin $C_{2a}$, as well as the stereo-

UNITED STATES PATENT OFFICE
CERTIFICATE OF CORRECTION

Patent No. 3,868,360　　　　　　　　Dated February 25, 1975

Inventor(s) Peter J. L. Daniels and Jay Weinstein

It is certified that error appears in the above-identified patent and that said Letters Patent are hereby corrected as shown below:

configuration about C-6' of gentamicin $C_2$ and $C_{2a}$---.
Column 13, line 48, "the 22"-O-" should read ---the 2"-O- ---.
Column 14, lines 16 - 17, "are gentamicin C1a, gentamicin $C_2$, gentamicin C2a," should read ---are gentamicin $C_{1a}$, gentamicin $C_2$, gentamicin $C_{2a}$,---. Column 15, line 16, "-methyllepimino-" should read --- -methylepimino- ---. Column 15, line 36, "1,3,2',6"-tetra-" should read ---1,3,2',6'-tetra- ---.
Column 16, line 16, "-3',4"N,O-" should read --- -3",4"-$\underline{N}$,$\underline{O}$- ---.
Column 16, line 19, "-3',4"-dideoxy-" should read --- -3",4"-dideoxy- ---. Column 16, line 21, "-3",4"-N,)-" should read --- 3",4"-$\underline{N}$,$\underline{O}$- ---. Column 16, lines 47 - 48, "1. b 4",6"-O-Benzylidene-1,3,2',6',3"-benzylidene-" should read ---(1) 4",6"-O-Benzylidene-1,3,2',6',3"-penta-$\underline{N}$- ---. Column 17, line 6, "Antibiotic G-14418" should read ---Antibiotic G-418---.
Column 17, line 21, "-benzlidene-" should read --- -benzylidene- ---. Column 17, line 31, "-benzylidene-3"4"-N,O-" should read --- -benzylidene-3",4"-$\underline{N}$,$\underline{O}$- ---. Column 18, line 24, "-3",4'-N,O-p-" should read --- -3",4"-$\underline{N}$,$\underline{O}$-p- ---. Column 18, line 37, "4",6"-o-" should read ---4",6"-$\underline{O}$- ---. Column 18, line 61, "2'-O-methane-sulfonyl-" should read ---2"-O-methane-sulfonyl- ---. Column 19, line 47, "E. 2"-O-p-toluene sulfonyl-N-" should read ---E. 2"-O-p-toluene sulfonyl per-N- ---. Column 20, line 13, "methyanasulfonyl-" should read ---methane-sulfonyl- ---. Column 20, lines 40 - 41, "2J=3.75 Hz," should read ---doublet, 2H, J=3.75 Hz,---. Column 21, line 58, "resin ($NH_4115^{\oplus}$ cycle)." should read ---resin ($NH_4^{\oplus}$ cycle).---.
Column 22, lines 51 - 52, "gentamicin C1a, gentamicin $C_2$, gentamicin C2a" should read ---gentamicin $C_{1a}$, gentamicin $C_2$, gentamicin $C_{2a}$---. Column 22, line 53, "robramycin," should read ---tobramycin,---. Column 22, line 60, "grup consisting" should read ---group consisting---.

Column 23, line 29,

UNITED STATES PATENT OFFICE
CERTIFICATE OF CORRECTION

Patent No. 3,868,360  Dated February 25, 1975

Inventor(s) Peter J. L. Daniels and Jay Weinstein

It is certified that error appears in the above-identified patent and that said Letters Patent are hereby corrected as shown below:

"treating 1,3,2,6'-tetra-" should read ---treating 1,3,2',6'-tetra- ---.  Column 23, line 48, "groups in an" should read ---group in an---.  Column 24, line 66, "sterochemistry at" should read ---stereochemistry at---.

Signed and Sealed this seventeenth Day of February 1976

[SEAL]

Attest:

RUTH C. MASON  
Attesting Officer

C. MARSHALL DANN  
Commissioner of Patents and Trademarks